United States Patent
Wang

(10) Patent No.: US 10,047,779 B2
(45) Date of Patent: Aug. 14, 2018

(54) FASTENING DEVICE

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD. (TW)

( * ) Notice: Subject to any disclaimer, the term of this patent is extended or adjusted under 35 U.S.C. 154(b) by 564 days.

(21) Appl. No.: 14/471,002

(22) Filed: Aug. 28, 2014

(65) Prior Publication Data

US 2015/0063905 A1 Mar. 5, 2015

(30) Foreign Application Priority Data

Aug. 29, 2013 (TW) .............................. 102216204 U

(51) Int. Cl.
*F16B 21/09* (2006.01)

(52) U.S. Cl.
CPC ............ *F16B 21/09* (2013.01); *Y10T 403/602* (2015.01)

(58) Field of Classification Search
CPC .. F16B 19/1063; F16B 19/109; F16B 5/0036; F16B 5/008; F16B 5/0208; F16B 5/0266; F16B 21/09; F16B 12/22; F16B 12/34; Y10T 403/602
USPC ............................................... 411/46, 47, 48
See application file for complete search history.

(56) References Cited

U.S. PATENT DOCUMENTS

| | | | | |
|---|---|---|---|---|
| 3,239,988 A * | 3/1966 | Meyer | ...................... | F16B 5/128 24/297 |
| 3,465,803 A * | 9/1969 | Swanstrom | ........... | F16B 5/0208 411/349 |
| 3,508,371 A * | 4/1970 | Meyer | ................... | F16B 5/0642 24/295 |
| 4,140,414 A * | 2/1979 | Buttgereit | .............. | A47B 57/50 211/182 |
| 6,033,145 A * | 3/2000 | Xu | ........................... | B62D 1/10 403/256 |
| 6,074,146 A * | 6/2000 | Soemer | ................. | F16B 5/0208 411/107 |
| 6,468,012 B2 * | 10/2002 | Ellis | ...................... | F16B 41/002 411/107 |
| 6,761,521 B2 * | 7/2004 | McCormack | ......... | F16B 5/0208 411/107 |
| 6,955,512 B2 * | 10/2005 | Allen | .................... | F16B 21/186 211/26 |

(Continued)

*Primary Examiner* — Jonathan Peter Masinick
*Assistant Examiner* — Matthew R McMahon
(74) *Attorney, Agent, or Firm* — Schmeiser, Olsen & Watts, LLP

(57) ABSTRACT

A fastening device is provided, which includes a locating seat for engaging with a first workpiece; a fastening member including sequentially connected stop unit, shank unit and fastening unit, the fastening unit being configured for fastening to a second workpiece; a reciprocation actuator movably disposed on the locating seat with the shank unit extended through and movably located in the reciprocation actuator and the locating seat, the stop unit abutted on a top of the reciprocation actuator, the fastening unit movable in a reciprocating motion between an inner side and an outer side of the locating seat or outside the locating seat; and an elastic element having an end pressed against the locating seat and another end pressed against the fastening member.

16 Claims, 11 Drawing Sheets

(56) References Cited

U.S. PATENT DOCUMENTS

| | | | | |
|---|---|---|---|---|
| 7,789,605 | B2* | 9/2010 | Kidman | F16B 19/1072 |
| | | | | 411/34 |
| 7,922,432 | B2* | 4/2011 | Chiu | F16B 5/0208 |
| | | | | 411/107 |
| 8,356,954 | B2* | 1/2013 | Koch | F16B 21/09 |
| | | | | 403/353 |
| 8,393,840 | B2* | 3/2013 | Chiu | F16B 5/0208 |
| | | | | 411/353 |
| 8,579,356 | B2* | 11/2013 | Turner | B62D 35/005 |
| | | | | 296/180.1 |
| 8,720,156 | B2* | 5/2014 | Porter | F16B 21/09 |
| | | | | 411/349 |
| 2004/0112718 | A1* | 6/2004 | Brixius | F16B 21/09 |
| | | | | 198/788 |
| 2009/0202318 | A1* | 8/2009 | Wang | F16B 5/0208 |
| | | | | 411/295 |
| 2009/0202319 | A1* | 8/2009 | Wang | F16B 5/0208 |
| | | | | 411/353 |
| 2010/0166494 | A1* | 7/2010 | Cochard | F16B 5/07 |
| | | | | 403/52 |

* cited by examiner

US 10,047,779 B2

FASTENING DEVICE

CROSS-REFERENCE TO RELATED APPLICATION

This non-provisional application claims priority under 35 U.S.C. § 119(a) on Patent Application No(s). 102216204 filed in Taiwan, R.O.C. on Aug. 29, 2013, the entire contents of which are hereby incorporated by reference.

FIELD OF TECHNOLOGY

The present invention relates to a fastening device, and more particularly to a fastening device that includes a reciprocation actuator to prevent a fastening member of the device from shaking, so that a fastening unit of the fastening member can be conveniently moved in a reciprocating motion inside and outside a locating seat of the device and be fastened to a workpiece accurately.

BACKGROUND OF THE INVENTION

A conventional tool for fixedly holding two workpieces together is usually a telescopic screw, which includes a sleeve, a screw and a spring. To use the conventional telescopic screw, first fix the sleeve to a workpiece, and then extend the screw through the workpiece to lock to another workpiece, so that the two workpieces are held to each other. However, in the conventional telescopic screw, the screw tends to shake relative to the sleeve and could not be easily aligned with the fastening hole formed on the other workpiece. In addition, the screw for the conventional telescopic screw has a relatively small head, preventing the screw from being easily pushed downward or pulled upward in the process of aligning the screw with the fastening hole.

It is therefore tried by the inventor to develop an improved fastening device that includes a reciprocation actuator to prevent a fastening member of the fastening device from shaking, so that a fastening unit of the fastening member can be conveniently moved in a reciprocating motion inside and outside a locating seat of the fastening device and be accurately fastened to a workpiece.

SUMMARY

A primary object of the present invention is to provide an improved fastening device that includes a reciprocation actuator to prevent a fastening member of the device from shaking, so that a fastening unit of the fastening member can be conveniently moved in a reciprocating motion inside and outside a locating seat of the device and be fastened to a workpiece accurately.

To achieve the above and other objects, the fastening device according to the present invention includes, in a first configuration thereof, a locating seat for fixedly engaging with a first workpiece; a fastening member including a stop unit, a shank unit and a fastening unit sequentially connected to one another from top to bottom, and the fastening unit being configured for fastening to a second workpiece; a reciprocation actuator being movably disposed on a top of the locating seat, such that the shank unit is extended through and movably located in the reciprocation actuator and the locating seat with the stop unit abutting on a top of the reciprocation actuator, and the fastening unit is movable in a reciprocating motion between an inner side and an outer side the locating seat or outside the locating seat; and an elastic element having an end pressed against the locating seat and another end pressed against the fastening member.

To achieve the above and other objects, the fastening device according to the present invention includes, in a second configuration thereof, a locating seat for fixedly engaging with a first workpiece; a fastening member including a stop unit, a shank unit and a fastening unit sequentially connected to one another from top to bottom, and the fastening unit being configured for fastening to a second workpiece; a reciprocation actuator being movably disposed on a top of the locating seat and including a retraction and push unit, such that the shank unit is extended through and movably located in the reciprocation actuator and the locating seat with the stop unit abutting on a top of the retraction and push unit, and the fastening unit is movable in a reciprocating motion between an inner side and an outer side the locating seat or outside the locating seat; and an elastic element having an end pressed against the locating seat and another end pressed against the fastening member.

To achieve the above and other objects, the fastening device according to the present invention includes, in a third configuration thereof, a locating seat for fixedly engaging with a first workpiece; a fastening member including a stop unit, a shank unit and a fastening unit sequentially connected to one another from top to bottom, the fastening unit being configured for fastening to a second workpiece, and the stop unit including an inward-tilting prevention surface; a reciprocation actuator being movably disposed on a top of the locating seat and including an outward-tilting prevention surface, with which the inward-tilting prevention surface being in slidable contact, such that the shank unit is extended through and movably located in the reciprocation actuator and the locating seat, and the fastening unit is movable in a reciprocating motion between an inner side and an outer side the locating seat or outside the locating seat; and an elastic element having an end pressed against the locating seat and another end pressed against the fastening member.

According to an embodiment of the fastening device of the present invention, the reciprocation actuator includes a locating slot, in which the stop unit of the fastening member is temporarily held.

According to an embodiment of the fastening device of the present invention, the reciprocation actuator includes a horizontal slot, a retraction zone, an outward-tilting prevention surface, and a push zone. The retraction zone, the outward-tilting prevention surface and the push zone are sequentially arranged to form a stepped structure; the horizontal slot communicates the retraction zone, the outward-tilting prevention surface and the push zone with one another; the shank unit is extended through and movably located in the horizontal slot and the locating seat; and the stop unit is switchable among the retraction zone, the outward-tilting prevention surface and the push zone to abut on one of them.

According to an embodiment of the fastening device of the present invention, the reciprocation actuator includes a horizontal slot, a retraction zone, an outward-tilting prevention surface, and a push zone. The retraction zone, the outward-tilting prevention surface and the push zone are sequentially arranged to form a stepped structure; the horizontal slot communicates the retraction zone, the outward-tilting prevention surface and the push zone with one another; the shank unit is extended through and movably located in the horizontal slot and the locating seat; the stop unit is switchable among the retraction zone, the outward-tilting prevention surface and the push zone to abut on one of them; and the push zone is formed with a locating slot, in which the stop unit of the fastening member is temporarily held.

According to the fastening device of the present invention, the locating seat includes one of a riveting unit, a coupling unit, an expanding unit, a weld unit, a screwing unit, a magnetic unit, an adhering unit, and a lateral connecting unit for engaging with the first workpiece.

According to an embodiment of the fastening device of the present invention, the locating seat is integrally formed with the first workpiece.

According to the fastening device of the present invention, the fastening unit can be a column body, an engaging portion, an elastic engaging portion or a screw rod for fastening to the second workpiece.

According to an embodiment of the present invention, the reciprocation actuator can be made of a plastic material, an acrylic material, a silicone material or a rubber material.

According to an embodiment of the present invention, the reciprocation actuator can be made of a carbon steel material, a zinc alloy material, an aluminum alloy material, a copper material, and a stainless steel material.

According to an embodiment of the present invention, the reciprocation actuator includes a rail portion located between a bottom of the reciprocation actuator and the locating seat, and the locating seat includes a groove portion corresponding to the rail portion; and the rail portion is movably coupled with the corresponding groove portion.

According to the above embodiment, the rail portion includes two parallelly spaced guide rails, and the corresponding groove portion can be selected from the group consisting of an annular groove and two parallelly spaced guide grooves, the guide rails are bent inwardly to face each other; and the guide rails are movably engaged with the annular groove or the guide grooves.

With the above arrangements, the fastening device of the present invention including the reciprocation actuator can prevent the fastening member from shaking, so that the fastening unit of the fastening member can be conveniently moved in a reciprocating motion inside and outside the locating seat or outside the locating seat and be fastened to the second workpiece accurately.

BRIEF DESCRIPTION

The structure and the technical means adopted by the present invention to achieve the above and other objects can be best understood by referring to the following detailed description of the preferred embodiments and the accompanying drawings, wherein FIG. 1 is an exploded perspective view of a fastening device according to a preferred embodiment of the present invention;

DETAILED DESCRIPTION

Figure 1:
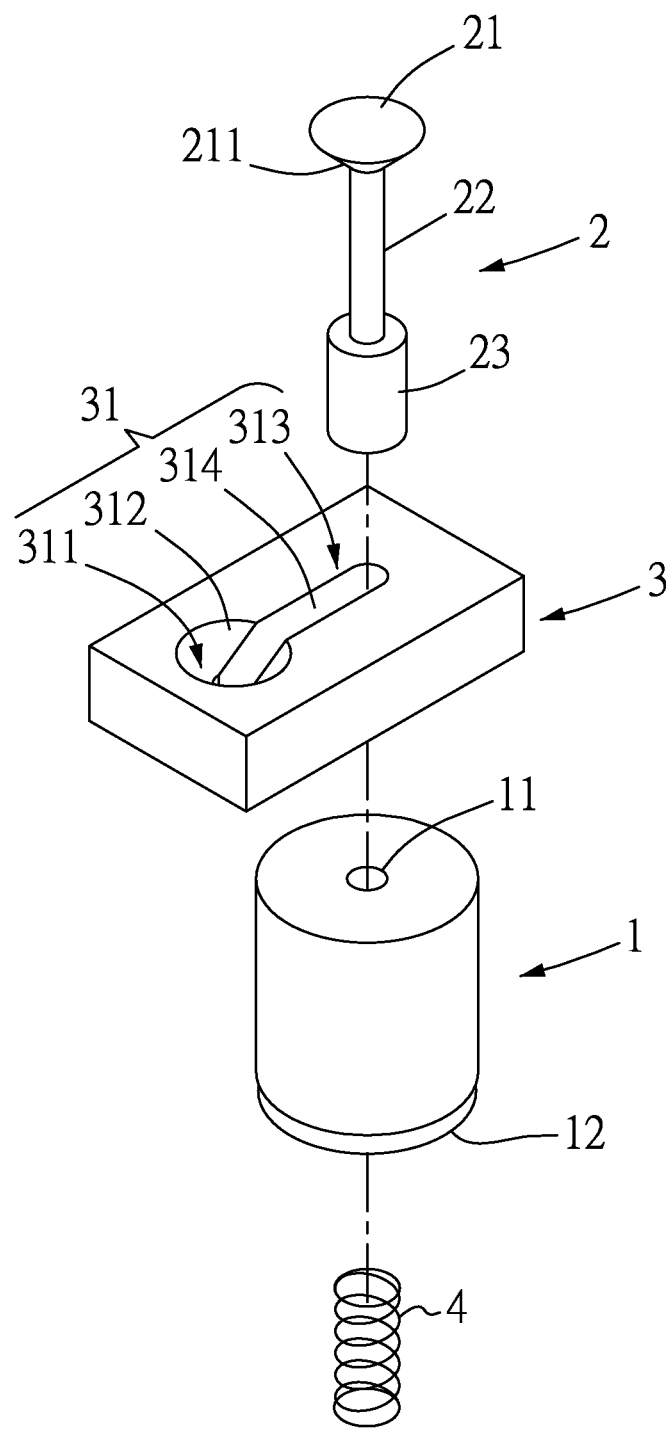

The present invention will now be described with some preferred embodiments thereof and by referring to the accompanying drawings. For the purpose of easy to understand, elements that are the same in the preferred embodiments are denoted by the same reference numerals.

Figure 2:
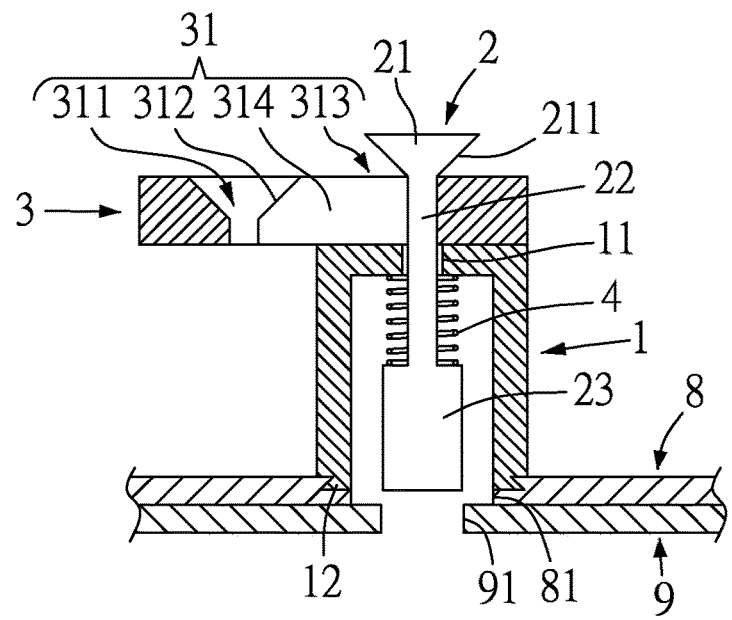
FIG. 2 is a first assembled sectional view showing the working manner of the fastening device according to the preferred embodiment of the present invention.
Figure 3:
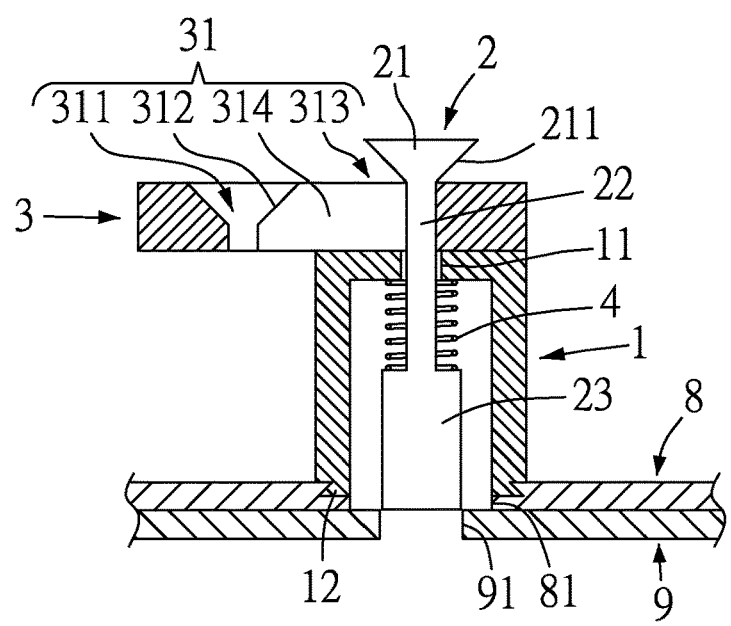
FIG. 3 is a second assembled sectional view showing the working manner of the fastening device according to the preferred embodiment of the present invention.
Figure 4:
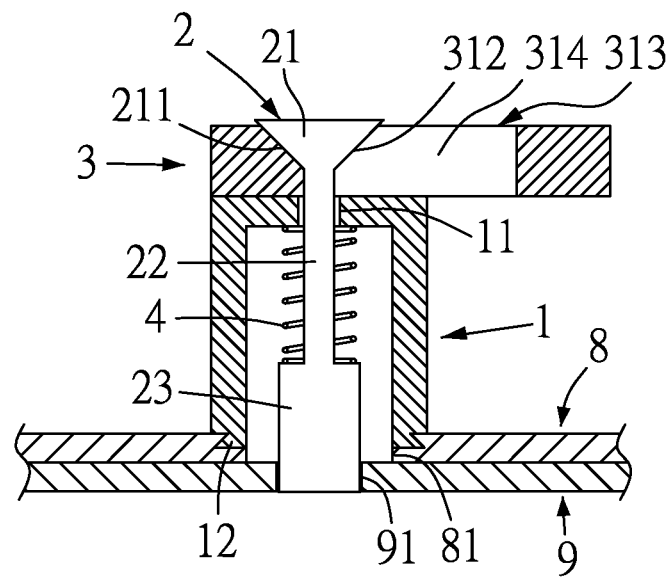
FIG. 4 is a third assembled sectional view showing the working manner of the fastening device according to the preferred embodiment of the present invention.

Please refer to FIG. 1 that is an exploded perspective view of a fastening device according to a preferred embodiment of the present invention, and to FIGS. 2 to 4 that are first, second and third assembled sectional views, respectively, showing the working manner of the fastening device of the present invention. As shown, according to a first configuration thereof, the fastening device of the present invention includes a locating seat 1, a fastening member 2, a reciprocation actuator 3, and an elastic element 4. The locating seat 1 is provided around a lower end with a coupling unit 12 for fixedly engaging with a locating hole 81 provided on and extended through a first workpiece 8, such as a plate or other differently structured object. The locating seat 1 can be configured as a cap with a through hole 11 formed on a top thereof. The fastening member 2 includes a stop unit 21, a shank unit 22 and a fastening unit 23, which are sequentially connected to one another from top to bottom. The stop unit 21 is downward tapered toward the shank unit 22. The fastening unit 23 is configured for extending through the locating hole 81 of the first workpiece 8 and be fastened to a fastening hole 91, such as a through hole or a blind hold, formed on a second workpiece 9, which can be a plate or other differently structured object. The fastening unit 23 can be configured as a column body having a cross-sectional area slightly larger than that of the fastening hole 91, so that the fastening unit 23 can be moved into and held to the fastening hole 91. The reciprocation actuator 3 is disposed on the top of the locating seat 1 to be sidewardly movable relative to the locating seat 1. The reciprocation actuator 3 can also rotatively move or wrench upwardly and downwardly relative to the locating seat 1. The shank unit 22 of the fastening member 2 is extended through and movably located in the reciprocation actuator 3 and the through hole 11 of the locating seat 1 with the stop unit 21 abutting on a top of the reciprocation actuator 3. The elastic element 4 can be a coil spring or any other type of spring or elastomer adapted to fit around the shank unit 22, such that an end of the elastic element 4 is pressed against an inner top surface of the locating seat 1 and another end of the elastic element 4 is pressed against the fastening unit 23 of the fastening member 2. To assemble the fastening member 2 to the locating seat 1 and the reciprocation actuator 3, first extend the shank unit 22 through the locating seat 1 and the reciprocation actuator 3, and then connect the stop unit 21 or the fastening unit 23 to an upper or a lower end of the shank unit 22, respectively, or machine the shank unit 22 to form the stop unit 21 or the fastening unit 23. When the reciprocation actuator 3 is moved leftward relative to the locating seat 1, as shown in FIG. 2 or 3, it also drives the stop unit 21, i.e. the fastening member 2, to move upward, so that the elastic element 4 is compressed between the locating seat 1 and the fastening unit 23. The compressed elastic element 4 produces an outward prestress, which brings the fastening member 2 to stably press against the top of the reciprocation actuator without the risk of shaking easily, so that the fastening unit 23 can be more easily aligned with the fastening hole 91 on the second workpiece 9. On the other hand, when the reciprocation actuator 3 is moved rightward relative to the locating seat 1, as shown in FIG. 4, the elastic element 4 is allowed to release the prestress and bring the stop unit 21 to move downward into the reciprocation actuator 3. At this point, the whole fastening member 2 moves downward, allowing the fastening unit 23 thereof to enter into the fastening hole 91 on the second workpiece 9 and therefore achieve the function of fastening the first workpiece 8 to the second workpiece 9.

In brief, in the first configuration of the fastening device according to the present invention, the reciprocation actuator 3 and the elastic element 4 work together for the fastening unit 23 to reciprocate axially without shaking the whole fastening member 2. More specifically, in the first configuration of the fastening device of the present invention, by providing the reciprocation actuator 3, the fastening unit 23 can be conveniently moved in a reciprocating motion between an inner side and an outer side the locating seat 1, as shown in FIGS. 2 and 4, or outside the locating seat 1, as shown in FIGS. 3 and 4.

Referring also to FIGS. 1 to 4. The fastening device of the present invention in a second configuration is different from the first one in that the reciprocation actuator 3 thereof includes a retraction and push unit 31, which brings the stop unit 21 of the fastening member 2 to retract into the reciprocation actuator 3 or pushes the stop unit 21 to the top of the reciprocation actuator 3, so that the fastening unit 23 is able to move in a reciprocating motion between an inner side and an outer side the locating seat 1, as shown in FIGS. 2 and 4, or outside the locating seat 1, as shown in FIGS. 3 and 4.

As can also be seen in FIGS. 1 to 4, the fastening device of the present invention in a third configuration is different from the first one in that the reciprocation actuator 3 thereof includes an outward-tilting prevention surface 312 and the stop unit 21 thereof correspondingly includes an inward-tilting prevention surface 211. The inward-tilting prevention surface 211 is in slidable contact with the outward-tilting prevention surface 312, and accordingly, allows the fastening unit 23 to move in a reciprocating motion between an inner side and an outer side the locating seat 1, as shown in FIGS. 2 and 4, or outside the locating seat 1, as shown in FIGS. 3 and 4.

Figure 5:
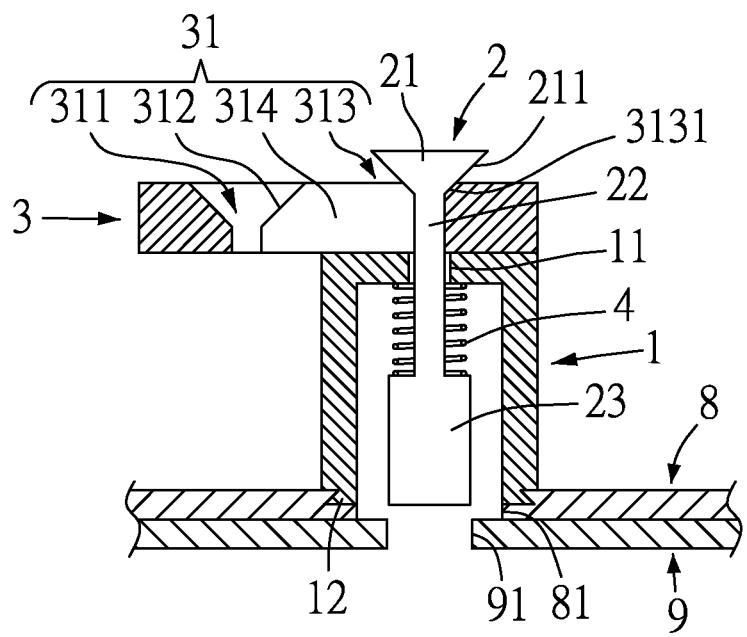
FIG. 5 is an assembled sectional view showing a locating slot is included in the fastening device of the present invention.

Please refer to FIG. 5. The reciprocation actuator 3 of the fastening device according to the preferred embodiment of the present invention is provided with a vertical locating slot 3131, in which the stop unit 21 of the fastening member 2 is temporarily held, allowing the fastening unit 23 to temporarily locate inside or outside the locating seat 1, as shown in FIGS. 5 and 3, respectively. With the locating slot 3131, the reciprocation actuator 3 is protected against arbitrary movement due to external force improperly applied thereto.

Referring to FIGS. 1 to 4 again. The retraction and push unit 31 of the reciprocation actuator 3 includes a horizontal slot 314, a retraction zone 311, the outward-tilting prevention surface 312, and a push zone 313. The retraction zone 311, the outward-tilting prevention surface 312 and the push zone 313 are sequentially arranged to form a stepped structure, and the horizontal slot 314 communicates the retraction zone 311, the outward-tilting prevention surface 312 and the push zone 313 with one another. More specifically, the retraction zone 311 is recessed compared to the push zone 313, and the push zone 313 is raised compared to the retraction zone 311. When the reciprocation actuator 3 is sidewardly movable relative to the locating seat 1, the shank unit 22 of the fastening member 2 is vertically movably located in the horizontal slot 314 and the locating seat 1, and the stop unit 21 is switchable among the retraction zone 311, the outward-tilting prevention surface 312 and the push zone 313 to abut one of them, so that the fastening unit 23 is able to move in a reciprocating motion between an inner side and an outer side the locating seat 1, as shown in FIGS. 2 and 4, or outside the locating seat 1, as shown in FIGS. 3 and 4. Further, the vertical locating slot 3131 is formed in the push zone 313.

Figure 6:
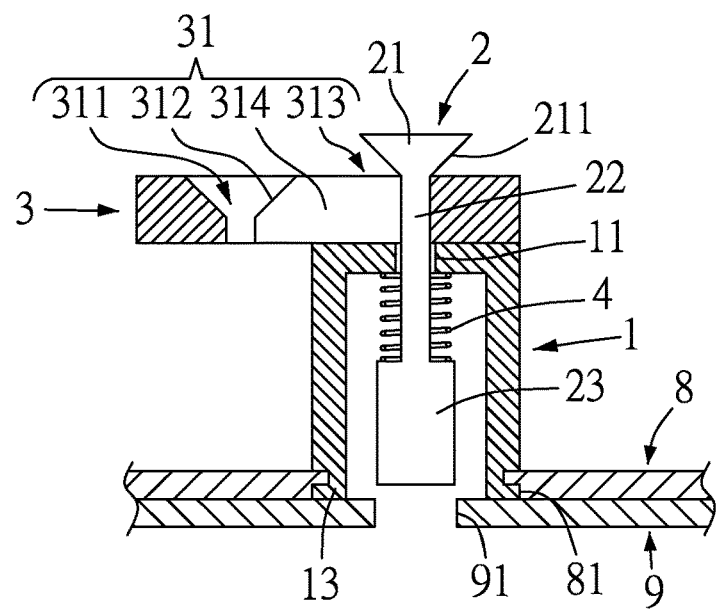
FIG. 6 is an assembled sectional view showing a riveting unit is included in the fastening device of the present invention.
Figure 7:
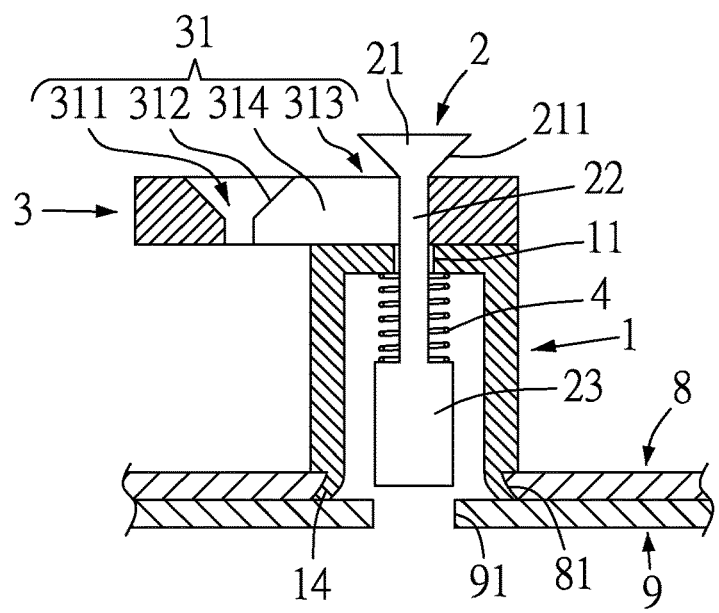
FIG. 7 is an assembled sectional view showing an expanding unit is included in the fastening device of the present invention.
Figure 8:
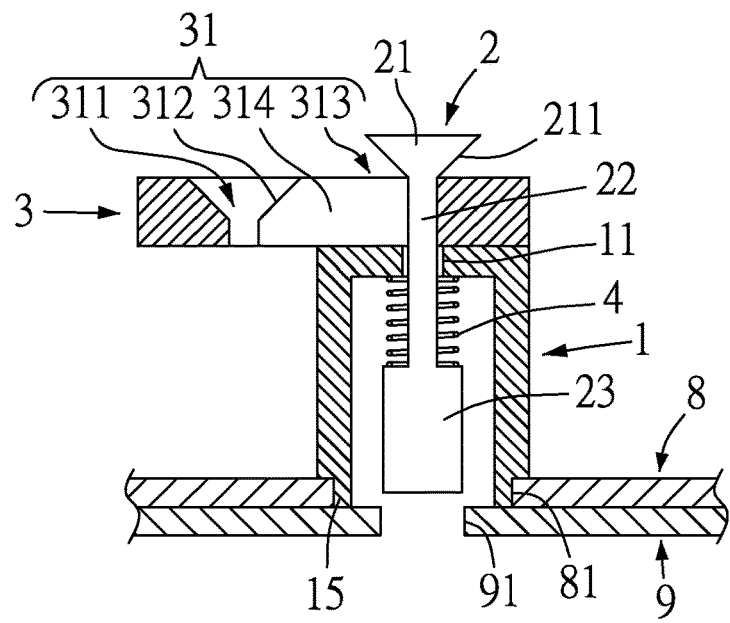
FIG. 8 is an assembled sectional view showing a weld unit is included in the fastening device of the present invention.
Figure 9:
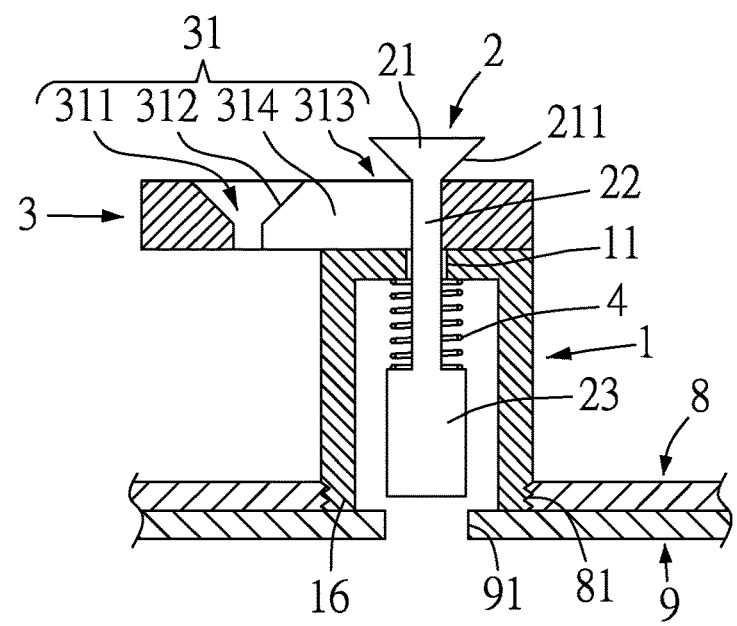
FIG. 9 is an assembled sectional view showing a screwing unit is included in the fastening device of the present invention.
Figure 10:
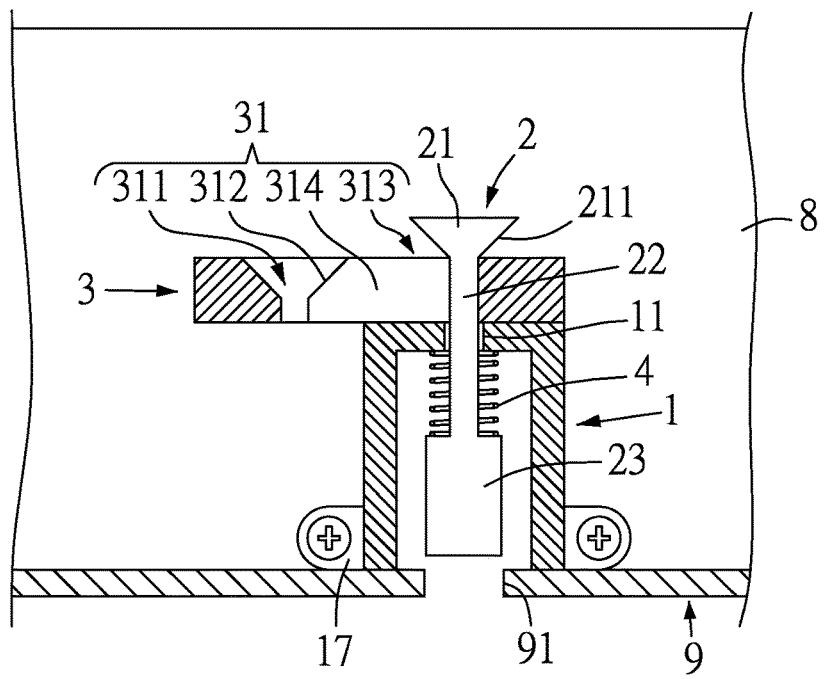
FIG. 10 is an assembled sectional view showing a lateral connecting unit is included in the fastening device of the present invention.

According to the preferred embodiment of the present invention, the lower end of the locating seat 1 can be connected to the locating hole 81 of the first workpiece 8 via some different means other than the coupling unit 12, such as a riveting unit 13 as shown in FIG. 6, an expanding unit 14 as shown in FIG. 7, a weld unit 15 as shown in FIG. 8, a screwing unit 16 as shown in FIG. 9, and a lateral connecting unit 17 as shown in FIG. 10. Alternatively, similar to the configuration shown in FIG. 8, the lower end of the locating seat 1 can be otherwise provided with an adhering unit, or a magnetic unit, provided the first and the second workpiece 8, 9 are both magnetic objects. In the case of using the lateral connecting unit 17, the first workpiece 8 and the second workpiece 9 can be perpendicularly connected to each other, and the lateral connecting unit 17 can be further fixed to the first workpiece 8 by means of riveting, expanding, welding, screwing, bonding, magnetically attracting, or other functionally equivalent means.

Figure 11:
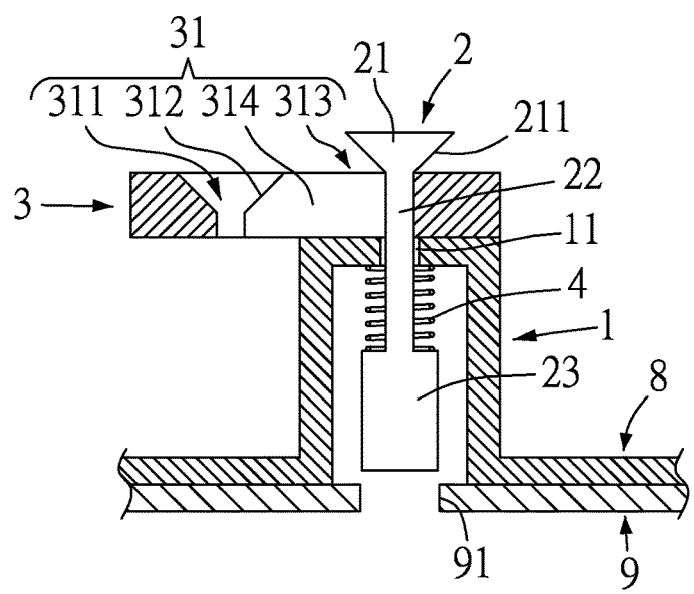
FIG. 11 is an assembled sectional view showing a locating seat included in the fastening device of the present invention is integrally formed with a first workpiece.

FIG. 11 shows another embodiment of the present invention, in which the locating seat 1 is integrally formed with the first workpiece 8.

Figure 12:
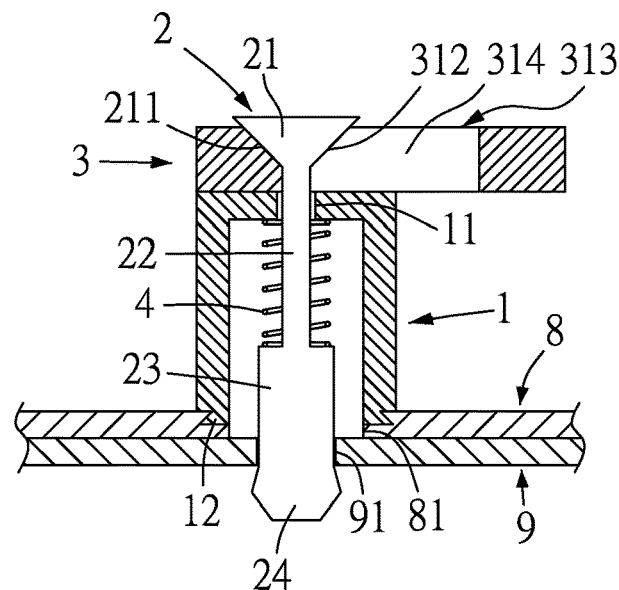
FIG. 12 is an assembled sectional view showing a fastening unit included in the fastening device of the present invention is configured as an engaging portion.
Figure 13:
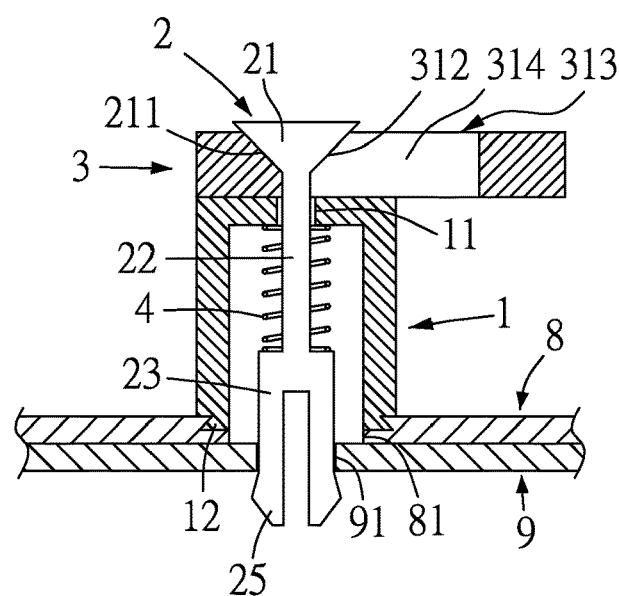
FIG. 13 is an assembled sectional view showing a fastening unit included in the fastening device of the present invention is configured as an elastic engaging portion.
Figure 14:
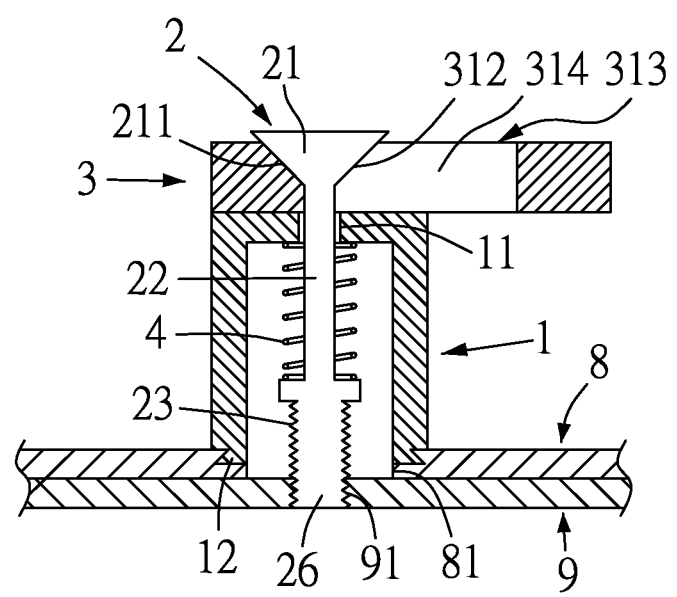
FIG. 14 is an assembled sectional view showing a fastening unit included in the fastening device of the present invention is configured as a screw rod.

According to the present invention, the fastening unit 23 is not necessarily limited to the shape of a column body, but can be other shapes. For example, the fastening unit 23 can be configured as an engaging portion 24 as shown in FIG. 12, an elastic engaging portion 25 as shown in FIG. 13, or a screw rod 26 as shown in FIG. 14 for fastening to the second workpiece 9.

Figure 15:
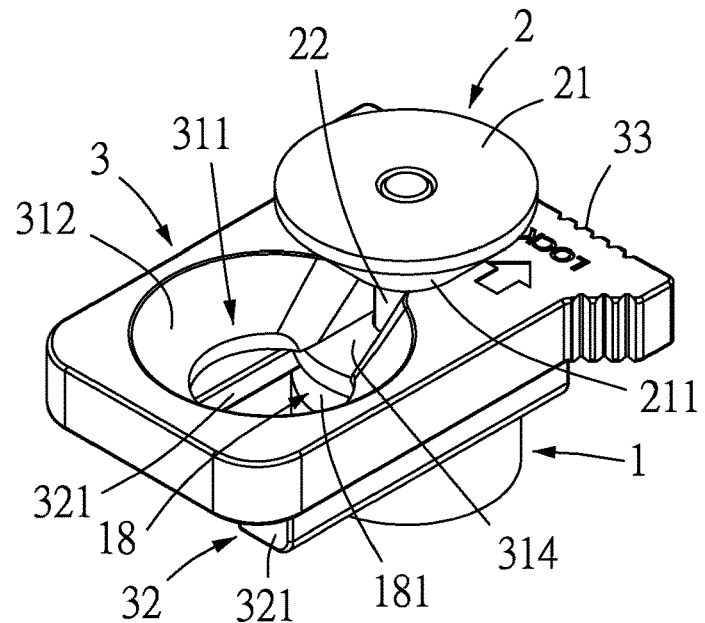
FIG. 15 is a perspective view showing another preferred embodiment of the fastening device according to the present invention.
Figure 16:
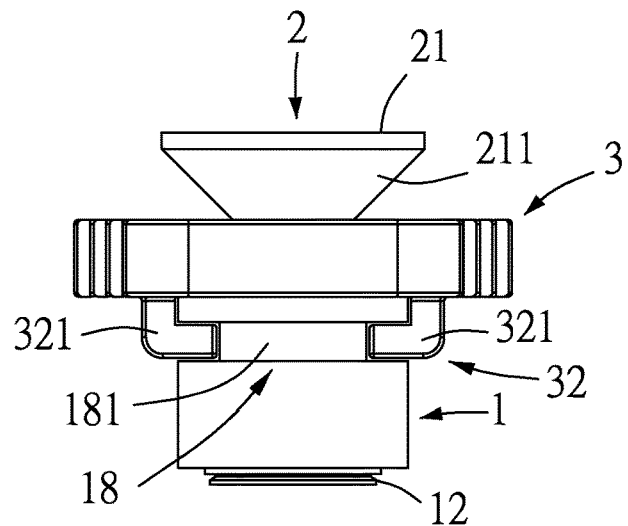
FIG. 16 is a front end view of FIG. 15.
Figure 19:
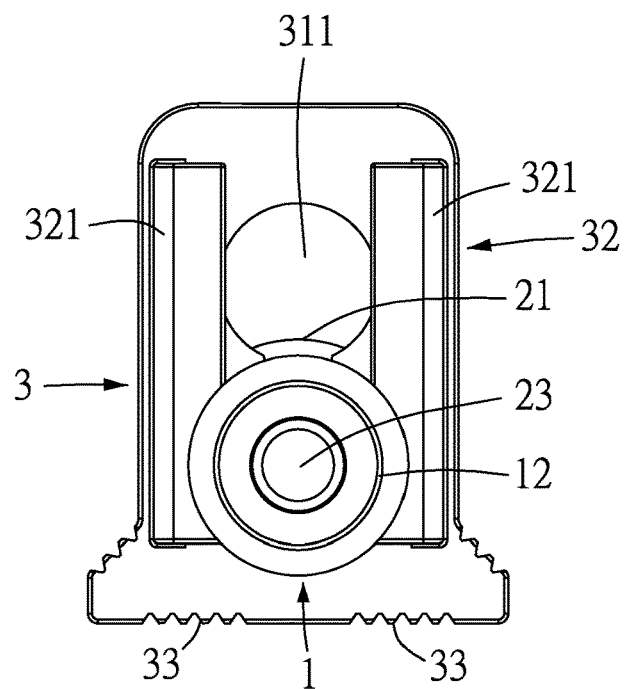
FIG. 19 is a bottom view common to both preferred embodiments of FIGS. 15 and 17.
Figure 20:
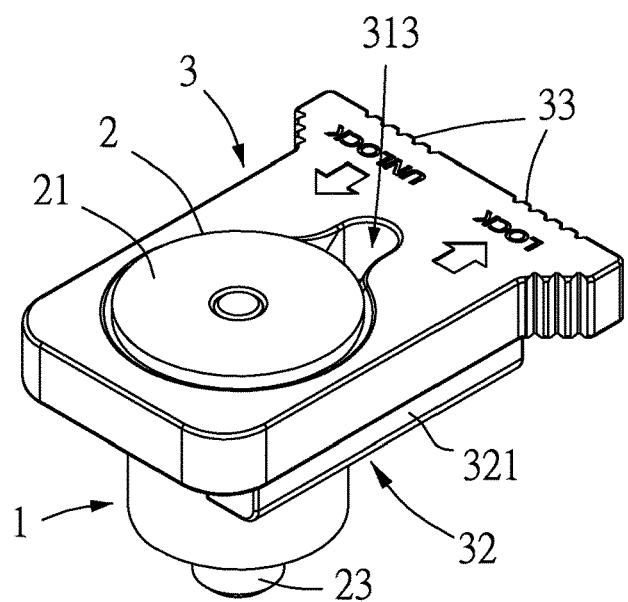
FIG. 20 is a perspective view common to both preferred embodiments of FIGS. 15 and 17, showing the working manner thereof.

FIGS. 15 and 16 are perspective and front end views, respectively, of another preferred embodiment of the fastening device according to the present invention, FIG. 19 is a bottom view of FIG. 15, and FIG. 20 shows the working manner of the fastening device of FIG. 15. As shown, in this embodiment, the reciprocation actuator 3 of the fastening device further includes a rail portion 32 located between a bottom of the reciprocation actuator 3 and the locating seat 1, and the locating seat 1 is correspondingly provided on an outer surface with a groove portion 18, such that the rail portion 32 is movably coupled with the corresponding groove portion 18. The rail portion 32 includes two parallelly spaced guide rails 321, the guide rails 321 are bent inwardly to face each other; and the corresponding groove portion 18 includes an annular groove 181, such that the guide rails 321 are movably engaged with the annular groove 181. With these arrangements, the reciprocation actuator 3 can stably reciprocate forward and backward on and relative to the locating seat 1 without separating therefrom, and accordingly, the fastening member 2 can also stably reciprocate upward and downward relative to the locating seat 1. Moreover, in this embodiment, the reciprocation actuator 3 can be rotated relative to the locating seat 1 to a specific direction for use.

Figure 17:
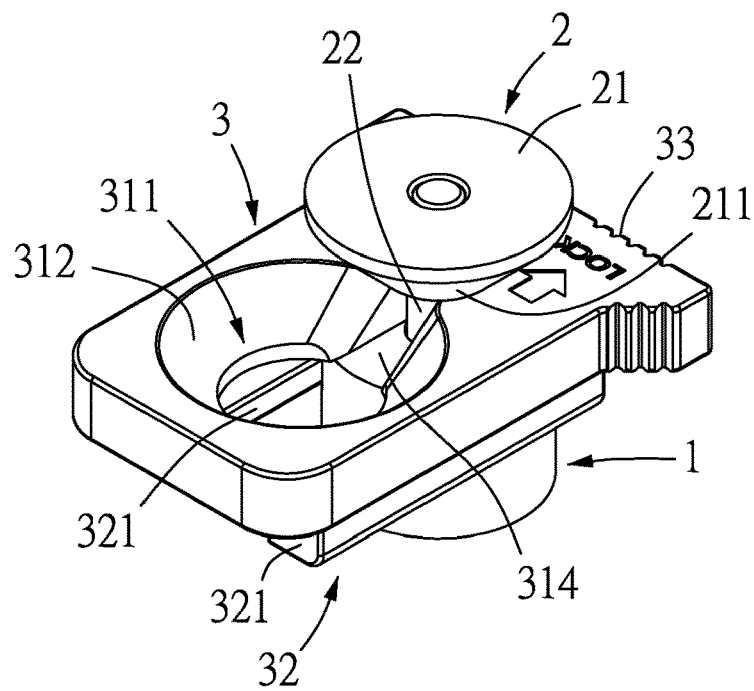
FIG. 17 is a perspective view showing a further preferred embodiment of the fastening device according to the present invention.
Figure 18:
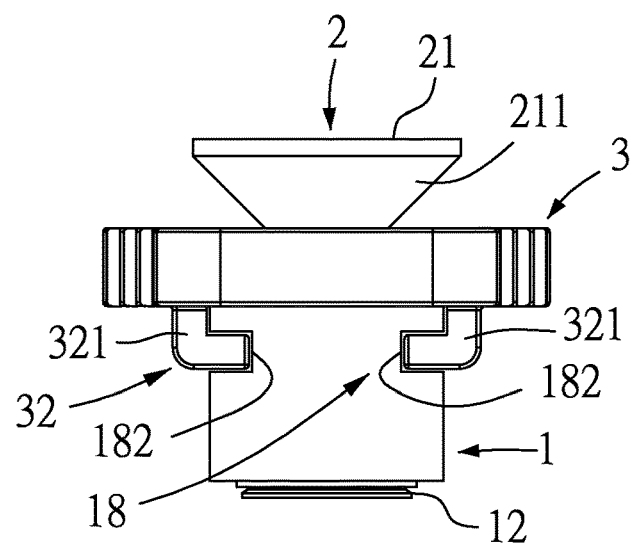
FIG. 18 is a front end view of FIG. 17.

FIGS. 17 and 18 are perspective and front end views, respectively, of a further preferred embodiment of the fastening device according to the present invention, FIG. 19 is also a bottom view of FIG. 17, and FIG. 20 also shows the working manner of the fastening device of FIG. 17. As shown, in this further embodiment, the reciprocation actuator 3 of the fastening device further includes a rail portion 32 located between a bottom of the reciprocation actuator 3 and the locating seat 1, and the locating seat 1 is correspondingly provided on an outer surface with a groove portion 18, such that the rail portion 32 is movably coupled with the corresponding groove portion 18. The rail portion 32 includes two parallelly spaced guide rails 321, the guide rails 321 are bent inwardly to face each other; and the corresponding groove portion 18 includes two parallelly spaced guide grooves 182, such that the guide rails 321 are movably engaged with the guide grooves 182, respectively. With these arrangements, the reciprocation actuator 3 can stably reciprocate forward and backward on and relative to the locating seat 1 without separating therefrom, and the fastening member 2 can also stably reciprocate upward and downward relative to the locating seat 1. Moreover, in this embodiment, the reciprocation actuator 3 is not rotatable relative to the locating seat 1 and can therefore be fixed to a specific direction for use.

As can be seen from FIGS. 15 and 17, the reciprocation actuator 3 can be further provided on a rear end with an anti-slip portion 33, which can be, for example, a corrugated surface or a coarsened surface, to facilitate easy holding and manipulating of the reciprocation actuator 3 for moving the latter forward and backward reciprocatingly.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fastening device, comprising:
   a first workpiece;
   a locating seat fixedly engaging with the first workpiece, the locating seat being a separate component from the first workpiece, wherein the locating seat projects upwardly from a surface of the first workpiece;
   a second workpiece;
   a fastening member including a stop unit, a shank unit and a fastening unit sequentially connected to one another from top to bottom, and the fastening unit fastening to the second workpiece;
   a reciprocation actuator being movably disposed on a top of the locating seat, such that the shank unit is extended through and movably located in the reciprocation actuator and the locating seat with the stop unit abutting on a top of the reciprocation actuator, and the fastening unit is movable in a reciprocating motion between an inner side and an outer side of the locating seat or outside the locating seat; and
   an elastic element having an end pressed against the locating seat and another end pressed against the fastening member;
   wherein the reciprocation actuator is actuated to achieve a retracted state where the fastening member is driven upwardly and away from the second workpiece to compress the elastic element and is aligned with a fastening hole of the second workpiece;
   wherein the reciprocation actuator is actuated to achieve a locked state from the retracted state, where the fastening member moves downward to enter the fastening hole to fasten the first workpiece to the second workpiece.

2. The fastening device as claimed in claim 1, wherein the reciprocation actuator includes a locating slot, in which the stop unit of the fastening member is temporarily held.

3. The fastening device as claimed in claim 2, wherein the reciprocation actuator includes a horizontal slot, a retraction zone, an outward-tilting prevention surface, and a push zone; the retraction zone, the outward-tilting prevention surface and the push zone being sequentially arranged to form a stepped structure; the horizontal slot communicating the retraction zone, the outward-tilting prevention surface and the push zone with one another; the shank unit being extended through and movably located in the horizontal slot and the locating seat; and the stop unit being switchable among the retraction zone, the outward-tilting prevention surface and the push zone to abut on one of them; and the locating slot being formed in the push zone.

4. The fastening device as claimed in claim 1, wherein the reciprocation actuator includes a horizontal slot, a retraction zone, an outward-tilting prevention surface, and a push zone; the retraction zone, the outward-tilting prevention surface and the push zone being sequentially arranged to form a stepped structure; the horizontal slot communicating the retraction zone, the outward-tilting prevention surface and the push zone with one another; the shank unit being extended through and movably located in the horizontal slot and the locating seat; and the stop unit being switchable among the retraction zone, the outward-tilting prevention surface and the push zone to abut on one of them.

5. The fastening device as claimed in claim 1, wherein the reciprocation actuator includes a rail portion located between a bottom of the reciprocation actuator and the locating seat, and the locating seat includes a groove portion corresponding to the rail portion; and the rail portion is movably coupled with the corresponding groove portion.

6. The fastening device as claimed in claim 5, wherein the rail portion includes two parallelly spaced guide rails, and the corresponding groove portion can be selected from the group consisting of an annular groove and two parallelly spaced guide grooves, the guide rails are bent inwardly to face each other; and the guide rails are movably engaged with the annular groove or the guide grooves.

7. A fastening device, comprising:
a first workpiece;
a locating seat fixedly engaging with the first workpiece, the locating seat being a separate component from the first workpiece, wherein the locating seat projects upwardly from a surface of the first workpiece;
a second workpiece;
a fastening member including a stop unit, a shank unit and a fastening unit sequentially connected to one another from top to bottom, and the fastening unit fastening to the second workpiece;
a reciprocation actuator being movably disposed on a top of the locating seat and including a retraction and push unit, such that the shank unit is extended through and movably located in the reciprocation actuator and the locating seat with the stop unit abutting on a top of the retraction and push unit, and the fastening unit is movable in a reciprocating motion between an inner side and an outer side of the locating seat or outside the locating seat; and
an elastic element having an end pressed against the locating seat and another end pressed against the fastening member;
wherein the reciprocation actuator is actuated to achieve a retracted state where the fastening member is driven upwardly and away from the second workpiece to compress the elastic element and is aligned with a fastening hole of the second workpiece;
wherein the reciprocation actuator is actuated to achieve a locked state from the retracted state, where the fastening member moves downward to enter the fastening hole to fasten the first workpiece to the second workpiece.

8. The fastening device as claimed in claim 7, wherein the reciprocation actuator includes a locating slot, in which the stop unit of the fastening member is temporarily held.

9. The fastening device as claimed in claim 8, wherein the reciprocation actuator includes a horizontal slot, a retraction zone, an outward-tilting prevention surface, and a push zone; the retraction zone, the outward-tilting prevention surface and the push zone being sequentially arranged to form a stepped structure; the horizontal slot communicating the retraction zone, the outward-tilting prevention surface and the push zone with one another; the shank unit being extended through and movably located in the horizontal slot and the locating seat; and the stop unit being switchable among the retraction zone, the outward-tilting prevention surface and the push zone to abut on one of them; and the locating slot being formed in the push zone.

10. The fastening device as claimed in claim 7, wherein the reciprocation actuator includes a rail portion located between a bottom of the reciprocation actuator and the locating seat, and the locating seat includes a groove portion corresponding to the rail portion; and the rail portion is movably coupled with the corresponding groove portion.

11. The fastening device as claimed in claim 10, wherein the rail portion includes two parallelly spaced guide rails, and the corresponding groove portion can be selected from the group consisting of an annular groove and two parallelly spaced guide grooves, the guide rails are bent inwardly to face each other; and the guide rails are movably engaged with the annular groove or the guide grooves.

12. A fastening device, comprising:
a first workpiece;
a locating seat fixedly engaging with the first workpiece, the locating seat being a separate component from the first workpiece, wherein the locating seat projects upwardly from a surface of the first workpiece;
a second workpiece;
a fastening member including a stop unit, a shank unit and a fastening unit sequentially connected to one another from top to bottom; and the fastening unit fastening to the second workpiece, and the stop unit including an inward-tilting prevention surface;
a reciprocation actuator being movably disposed on a top of the locating seat and including an outward-tilting prevention surface, such that the shank unit is extended through and movably located in the reciprocation actuator and the locating seat with the inward-tilting prevention surface of the stop unit in slidable contact with the outward-tilting prevention surface, and the fastening unit is movable in a reciprocating motion between an inner side and an outer side of the locating seat or outside the locating seat; and
an elastic element having an end pressed against the locating seat and another end pressed against the fastening member;
wherein the reciprocation actuator is actuated to achieve a retracted state where the fastening member is driven upwardly and away from the second workpiece to compress the elastic element and is aligned with a fastening hole of the second workpiece;
wherein the reciprocation actuator is actuated to achieve a locked state from the retracted state, where the fastening member moves downward to enter the fastening hole to fasten the first workpiece to the second workpiece.

13. The fastening device as claimed in claim 12, wherein the reciprocation actuator includes a locating slot, in which the stop unit of the fastening member is temporarily held.

14. The fastening device as claimed in claim 13, wherein the reciprocation actuator includes a horizontal slot, a retraction zone, and a push zone; the retraction zone, the outward-tilting prevention surface and the push zone being sequentially arranged to form a stepped structure; the horizontal slot communicating the retraction zone, the outward-tilting prevention surface and the push zone with one another; the shank unit being extended through and movably located in the horizontal slot and the locating seat; and the stop unit being switchable among the retraction zone, the outward-tilting prevention surface and the push zone to abut on one of them; and the locating slot being formed in the push zone.

15. The fastening device as claimed in claim 12, wherein the reciprocation actuator includes a rail portion located between a bottom of the reciprocation actuator and the locating seat, and the locating seat includes a groove portion corresponding to the rail portion; and the rail portion is movably coupled with the corresponding groove portion.

16. The fastening device as claimed in claim 15, wherein the rail portion includes two parallelly spaced guide rails, and the corresponding groove portion can be selected from the group consisting of an annular groove and two parallelly spaced guide grooves, the guide rails are bent inwardly to face each other; and the guide rails are movably engaged with the annular groove or the guide grooves.

* * * * *